H. M. LAMBERT.
MOLD FOR PNEUMATIC TIRES.
APPLICATION FILED FEB. 11, 1922.

1,416,362.

Patented May 16, 1922.

INVENTOR
H. M. Lambert.
BY
ATTORNEYS

H. M. LAMBERT.
MOLD FOR PNEUMATIC TIRES.
APPLICATION FILED FEB. 11, 1922.
1,416,362. Patented May 16, 1922.
2 SHEETS—SHEET 2.
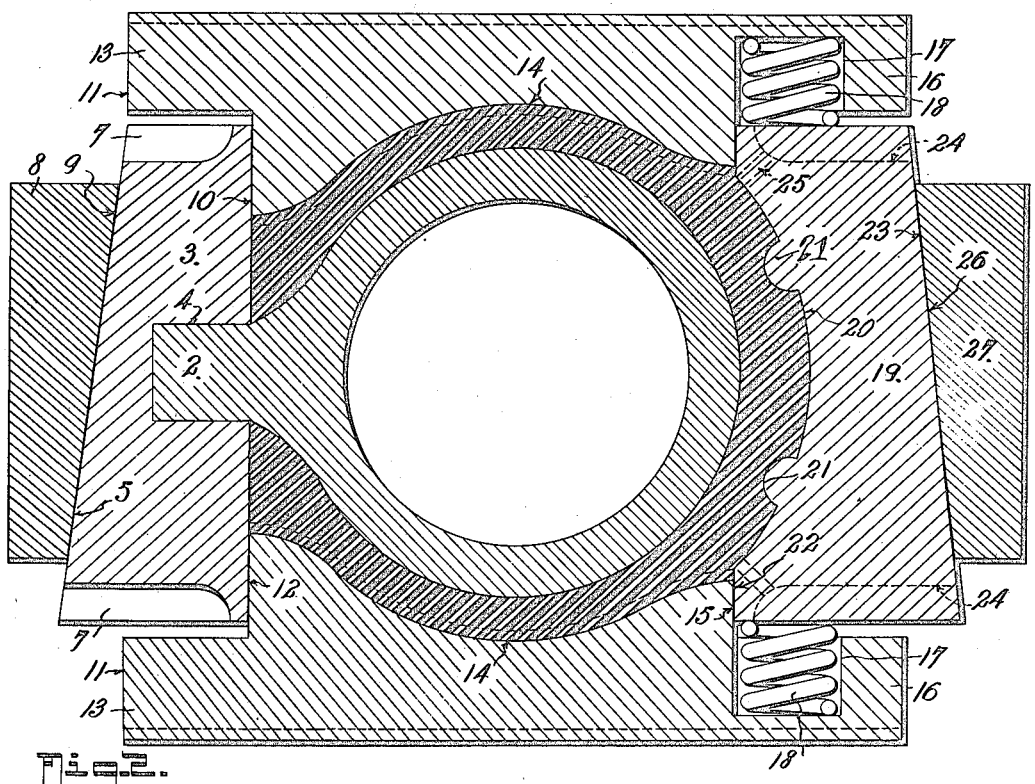
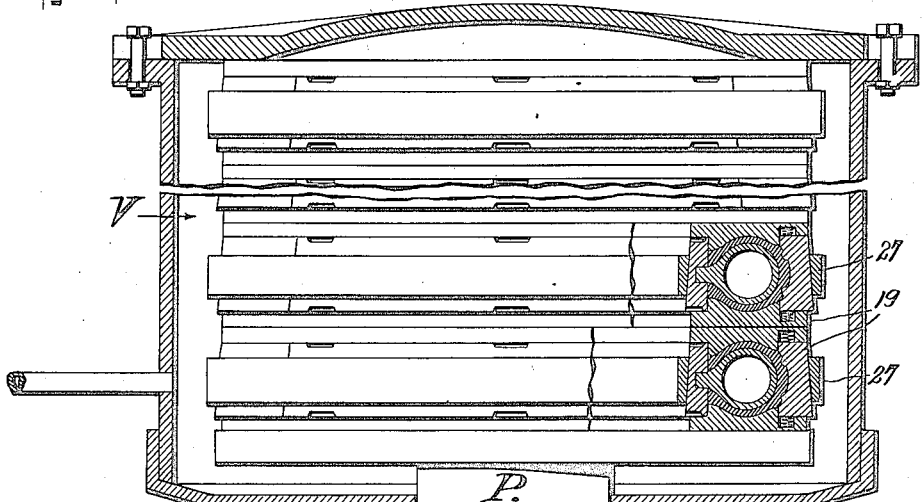
INVENTOR
H. M. Lambert
BY
ATTORNEYS

UNITED STATES PATENT OFFICE.

HENRY M. LAMBERT, OF PORTLAND, OREGON, ASSIGNOR TO LAMBERT TIRE & RUBBER COMPANY, OF AKRON, OHIO, A CORPORATION OF ARIZONA.

MOLD FOR PNEUMATIC TIRES.

1,416,362.  Specification of Letters Patent.  Patented May 16, 1922.

Application filed February 11, 1922. Serial No. 535,930.

*To all whom it may concern:*

Be it known that I, HENRY M. LAMBERT, a citizen of the United States, residing at Portland, in the county of Multnomah and State of Oregon, have invented certain new and useful Improvements in Molds for Pneumatic Tires, of which the following is a specification.

My invention relates to the art of manufacturing pneumatic tires and the same particularly relates to the molds used in vulcanizing the rubber of the tire after the tire has been built upon a suitable core. My improved mold comprises a sectional core annulus on which the tire is built up, a sectional base ring for holding the core annulus, side plates, and a tread annulus, the base ring, the side plates, and the tread annulus having interengaging parts to cooperate in molding the tire. The apparatus also has provision whereby the side plates may receive pressure (either by suitable clamps or in a hydraulic press) to compact the tire carcass and hold it during vulcanization.

The invention also has for its object to provide means for maintaining the tread annulus centralized with respect to the side plates, regardless of the position of the said plates or thickness of the side walls of the tire within the limits of the tire the apparatus is designed to receive.

In its more subordinate nature, the invention also includes those novel features of construction, combination and arrangement of the parts, all of which will be first fully described, then be specifically pointed out in the appended claims and illustrated in the accompanying drawings, in which:

Figure 3 is a cross section showing how the molds are placed in a hydraulic vulcanizer to compress the side plates to the maximum extent.

Figure 4 is a detail sectional perspective view of one of the tread band or annulus sections of the mold taken through the pinch bar holes and overflow holes.

Figure 1:
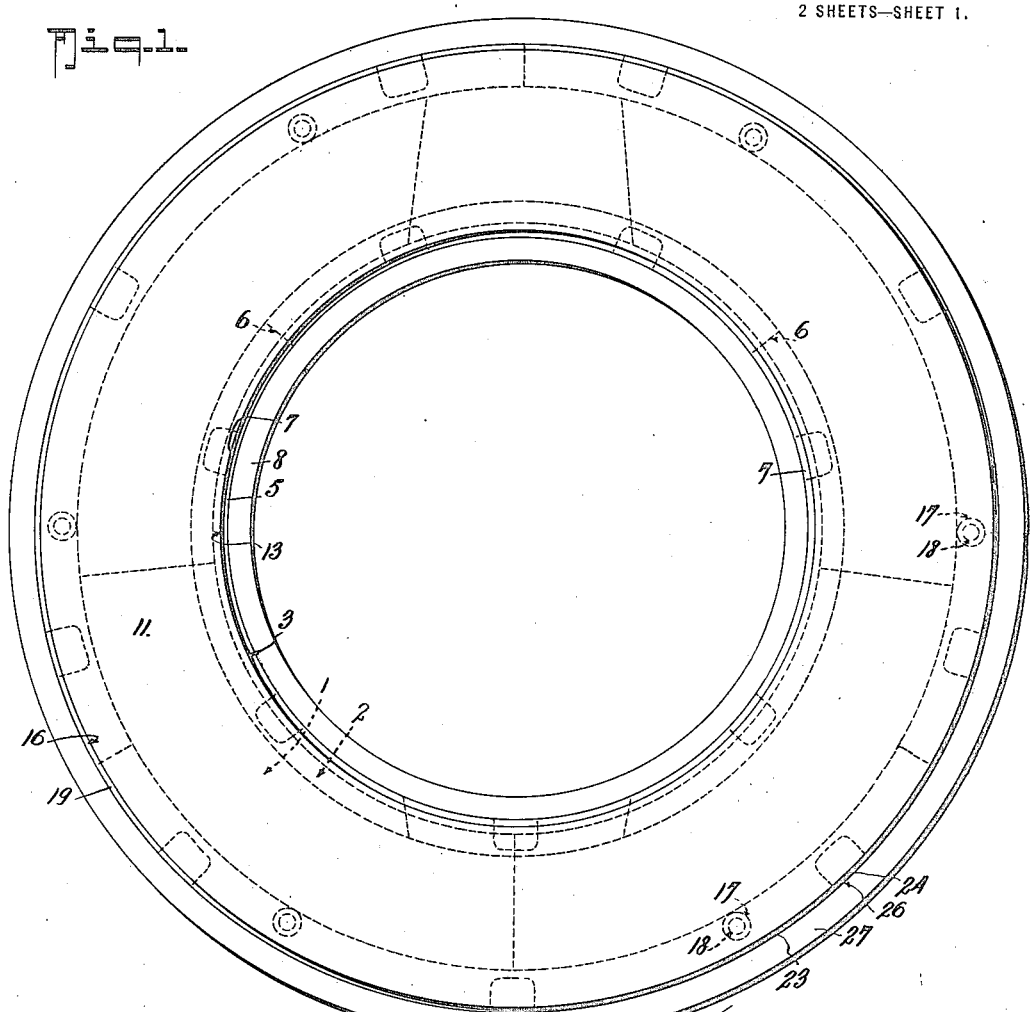
Figure 1 is a side elevation of a mold unit complete.
Figure 2:
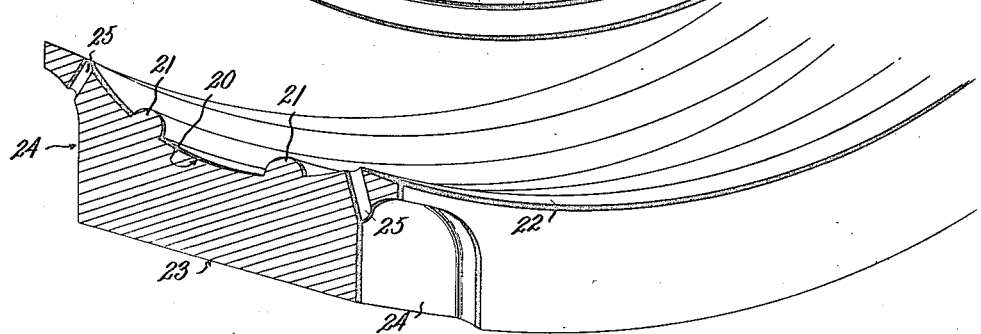
Figure 2 is a cross section of the same showing the position of the parts before the side plates are put under pressure.

In the drawings, in which like numerals of reference indicate like parts in all of the figures, 1 represents the core on which the tire is built up, the core being usually hollow and is made in sections so that it may be readily removed from the tire on completion of the same, the core having a shank 2 which is adapted to set in the annular groove or recess 4 of the inner mold annulus or sectional ring 3. The ring 3 is made in sections so that it may be easily positioned with respect to the core, and easily removed after the tire has been vulcanized. The inner annulus or ring 3 has its face 5 bevelled as best shown in Figure 2, to cooperate with the correspondingly bevelled face 9 of a solid ring 8 which is adapted to be forced into the annulus 3 to expand it into engagement with the tire and core. The annulus 3 is, as before stated, made in sections with the ends 6 designed to abut one another. 7 indicates pinch bar grooves or holes in the annulus 3 in which a suitable tool can be introduced for the purpose of prying the side plates 11 off after vulcanization has been effected.

The annular face 10 of the annulus 3 is of cylindrical form having as its center of curvature the axial line of the annulus or of the tire, so as to engage the base of the tire.

11—11 designate the side plates of the mold which have annular surface portions 12—15 respectively for engaging with the corresponding faces 10 and 22 of the inner and outer rings 3 and 19 and the side plates 11 also having projections 13 and 16 to lay over the sides of the rings 3 and 19, as best shown in Figure 2, the projections or flanges 13 and 16 serving to limit the movement of the rings 11 toward one another when compression force is applied thereto. The outer surfaces of the rings 11 lie in parallel planes with the central vertical longitudinal plane of the mold (and, of course, of the tire). The opposing faces 14 of the side plates 11 are shaped to give the required outer configuration to the side walls of the tire, while the tread form is given to the tire by the inner surfaces 20 of the outer annulus 19, the latter being provided with ribs 21 to form the required grooves of the tread of the tire when a non-skid tire is to be made.

The outer annulus 19 is also made of sections, the ends of which abut one another, and the outer peripheral surface is also tapered as at 23 to correspond with the opposite tapered face 26 of the clamp ring 27, the latter being a continuous ring that is adapted to be forced over the sectional annulus 19 to hold it with its ends together in a continuous ring.

The side plates 11—11 may have pockets 17 in their flanges 16 to receive centering springs 18 which engage the sides of the annulus 19 and function to keep the annulus 19 centered with respect to the side plates 11 and the tread of the tire regardless of whether the side walls of the tire are thick or thin.

The annulus 19 is also provided with pinch bar grooves or holes 24 and, if desired, overflow holes 25 may be provided through which the excess tread rubber may be squeezed.

In using the invention, the tire is built up on the core 1 in the usual way and the inner annulus 3 is then placed in position with the core shank 2 in the recess or groove 4 and the ring 8 is forced home. The side plates and outer annulus 19 are then fitted into position and the ring 27 driven home. After which, the mold, either alone or together with other similar molds, is placed in the hydraulic vulcanizer V and pressure is applied to force the side plates 11—11 together until the flanges 13 and 16 engage the rings 3 and 19. Steam is then passed into the vulcanizer in the usual way and the tire subjected to the process of vulcanization. As soon as vulcanization has been completed the mold is removed from the vulcanizer kettle and the side plates 11—11 are prized off by the use of a suitable pinch bar or tool inserted in the slots or holes 7 and 24. The ring 27 is knocked off and the sectional annulus 19 removed from the tread. The ring 8 is also driven off and the sectional annulus 3 removed, after which the sectional core 1 can be taken out of the tire and the mold will be ready for use again.

By making the outer faces of the side plates 11 flat and in parallel planes, a number of molds can be stacked in the vulcanizer kettle and at the same time subjected to the pressure of the hydraulic plunger P, if desired. If the vulcanization is to take place in a kettle not provided with a hydraulic plunger or ram, suitable clamps of any approved and well-known construction can be used for forcing the plates 11 together and applying the necessary pressure to compact the mass of the tire.

From the foregoing description, taken in connection with the accompanying drawings, it is thought the complete construction and manner of using the invention will be clear to those skilled in the art.

What I claim is:

1. In tire molds, a sectional core on which the tire is built, a sectional base annulus, means for centralizing the core with respect to said annulus, means for holding the sections of said annulus in place, a tread annulus, and side mold plates cooperating with said annuli to mold the exterior of the tire.

2. In tire molds, a sectional core on which the tire is built, a sectional base annulus, means for centralizing the core with respect to said annulus, means for holding the sections of said annulus in place, a tread annulus, side mold plates cooperating with said annuli to mold the exterior of the tire, said tread annulus being formed in sections, and means for holding said last named sections in place.

3. In tire molds, a sectional core on which the tire is built, a sectional base annulus, means for centralizing the core with respect to said annulus, means for holding the sections of said annulus in place, a tread annulus, side mold plates cooperating with said annuli to mold the exterior of the tire, said tread annulus being formed in sections, means for holding the last named sections in place, and means for centralizing said tread annulus with respect to said side mold plates.

4. In tire molds, a sectional core on which the tire is built, a sectional base annulus, means for centralizing the core with respect to said annulus, means for holding the sections of said annulus in place, a tread annulus, side mold plates cooperating with said annuli to mold the exterior of the tire, and means for centralizing said tread annulus with respect to said side mold plates.

5. In tire molds, a central annular core having a central flange, a sectional base annulus having a recess for said flange, a device for holding the sections of said annulus in place, a sectional tread annulus, a device for holding the sections of said tread annulus in place, side mold plates adapted to be inserted between the base and tread annuli and having flanges overlying the sides thereof.

6. In tire molds, a central annular core having a central flange, a sectional base annulus having a recess for said flange, a device for holding the sections of said annulus in place, a sectional tread annulus, a device for holding the sections of said tread annulus in place, side plates adapted to be inserted between the base and tread annuli and having flanges overlying the sides thereof, said tread annulus having rubber-overflow holes.

7. In tire molds, a central annular core having a central flange, a sectional base annulus having a recess for said flange, a device for holding the sections of said annulus in place, a sectional tread annulus, a device for holding the sections of said tread annulus in place, side plates adapted to be inserted between the base and tread annuli and having flanges overlying the sides thereof, the aforesaid structure having provisions for the insertion of a pinch bar between said annuli and said side plates whereby said side plates may be prized loose after vulcanization.

8. In tire molds, a sectional base annulus; a sectional annular core, said annulus and said core having interengaging portions, a sectional tread annulus, side plates adapted to project between said annuli, said side plates being movable toward one another, means limiting the movement of said side plates toward one another, and wedge ring devices for holding the sections respectively of the base and tread annuli in place substantially as shown and described.

9. In tire molds, a sectional core on which the tire is built, a sectional base annulus, interengaging means connecting said core with said annulus, means for holding the sections of said annulus in place, a tread annulus, and side mold plates cooperating with said annuli to mold the exterior of the tire.

10. In tire molds, a sectional core on which the tire is built, a sectional base annulus, means connecting said core and said annulus, a sectional tread annulus, side mold plates adapted to enter between said annuli, means for spacing said side plates apart so that they may be moved together a limited distance, and means for holding the sections of said annuli in place.

11. In tire molds, a sectional core on which the tire is built, a base annulus composed of longitudinally aligning sections having grooves, said core having a web to enter said grooves, means for holding the sections of said annulus in place, a tread annulus, and side mold plates cooperating with said annuli to mold and shape the tire.

HENRY M. LAMBERT.